(12) United States Patent
Sin (10) Patent No.: US 8,833,383 B2
(45) Date of Patent: Sep. 16, 2014

(54) MULTI-VANE THROTTLE VALVE

(75) Inventor: Pheng Sin, Livermore, CA (US)

(73) Assignee: Ferrotec (USA) Corporation, Santa Clara, CA (US)

( * ) Notice: Subject to any disclaimer, the term of this patent is extended or adjusted under 35 U.S.C. 154(b) by 0 days.

(21) Appl. No.: 13/549,771

(22) Filed: Jul. 16, 2012

(65) Prior Publication Data

US 2013/0019951 A1    Jan. 24, 2013

Related U.S. Application Data

(60) Provisional application No. 61/509,765, filed on Jul. 20, 2011.

(51) Int. Cl.
*F16K 49/00* (2006.01)
(52) U.S. Cl.
USPC ........... 137/1; 137/334; 137/340; 137/601.09
(58) Field of Classification Search
CPC ..... F16K 49/00; F16K 49/002; F16K 49/005; F16K 49/007; F24F 13/15
USPC .......... 137/334, 340, 601.05, 601.06, 601.07, 137/601.08, 601.09, 601.11, 601.17, 1
See application file for complete search history.

(56) References Cited

U.S. PATENT DOCUMENTS

| | | | |
|---|---|---|---|
| 4,088,301 A | 5/1978 | Ehmig | |
| 4,169,488 A * | 10/1979 | Goloff et al. | 137/340 |
| 4,175,582 A * | 11/1979 | Ashdown et al. | 137/334 |
| 4,610,197 A * | 9/1986 | Van Becelaere | 454/335 |
| 4,785,851 A | 11/1988 | Peacock | |
| 4,800,915 A * | 1/1989 | Hormel | 137/340 |
| 5,100,100 A | 3/1992 | Benson et al. | |
| 5,120,019 A | 6/1992 | Davis, Jr. | |
| 5,314,164 A | 5/1994 | Smith | |
| 5,318,272 A | 6/1994 | Smith | |
| 5,485,542 A | 1/1996 | Ericson | |
| 5,517,966 A | 5/1996 | Kanazawa et al. | |
| 5,582,208 A | 12/1996 | Suzuki | |

(Continued)

FOREIGN PATENT DOCUMENTS

CA    1299970 C    5/1992
CH    699258 B1    2/2010

(Continued)

OTHER PUBLICATIONS

Machine translation of JP 2003-120857.*

(Continued)

*Primary Examiner* — Kevin Murphy
(74) *Attorney, Agent, or Firm* — Robert R. Deleault, Esq.; Mesmer & Deleault, PLLC (57) ABSTRACT

A multi-vane throttling valve for a vacuum process chamber includes a throttle chamber body having an inside exposed to the vacuum process chamber and an outside exposed to atmospheric pressure, the chamber body defining a through-opening for controlling vacuum within the vacuum process chamber, a plurality of rotatable vanes mounted within the through-opening for controlling a flow of gases through the through-opening where each rotatable vane includes a cooling flow pathway in fluid communication with and disposed longitudinally along each rotatable vane, and a drive mechanism disposed on and connected to an outside of the throttle chamber body for rotating the plurality of rotatable vanes to vary the flow of process gases.

19 Claims, 10 Drawing Sheets

(56) References Cited

U.S. PATENT DOCUMENTS

| | | | |
|---|---|---|---|
| 5,706,851 A * | 1/1998 | Lopez-Gomez et al. | 137/246.22 |
| 5,727,769 A | 3/1998 | Suzuki | |
| 5,765,592 A * | 6/1998 | Karlicek | 137/601.06 |
| 5,927,331 A | 7/1999 | Suzuki | |
| 5,971,010 A * | 10/1999 | Kallberg et al. | 137/340 |
| 6,089,537 A | 7/2000 | Olmsted | |
| 6,152,421 A | 11/2000 | Suzuki | |
| 6,161,576 A | 12/2000 | Maher et al. | |
| 6,293,306 B1 | 9/2001 | Brenes | |
| 6,328,051 B1 | 12/2001 | Maher | |
| 6,367,770 B1 | 4/2002 | Duelli | |
| 6,409,149 B1 | 6/2002 | Maher, Jr. | |
| 6,427,969 B1 | 8/2002 | Ho et al. | |
| 6,431,518 B1 | 8/2002 | Geiser | |
| 6,439,255 B1 | 8/2002 | Chamberlain | |
| 6,471,181 B2 | 10/2002 | Duelli | |
| 6,494,434 B1 | 12/2002 | Geiser | |
| 6,505,812 B1 | 1/2003 | Anastas | |
| 6,513,323 B1 * | 2/2003 | Weigl et al. | 60/286 |
| 6,629,682 B2 | 10/2003 | Duelli | |
| 6,685,163 B2 | 2/2004 | Blecha | |
| 6,698,719 B2 | 3/2004 | Geiser | |
| 6,776,394 B2 | 8/2004 | Lucas | |
| 6,863,256 B2 | 3/2005 | Lucas | |
| 6,916,004 B2 | 7/2005 | Suzuki | |
| 6,994,311 B2 | 2/2006 | Duelli et al. | |
| 6,994,317 B2 | 2/2006 | Fischer | |
| 7,011,294 B1 | 3/2006 | Ehrne et al. | |
| 7,032,882 B2 | 4/2006 | Lucas et al. | |
| 7,036,794 B2 | 5/2006 | Duelli et al. | |
| 7,051,991 B2 | 5/2006 | Suzuki | |
| 7,073,771 B2 | 7/2006 | Shajii et al. | |
| 7,134,642 B2 | 11/2006 | Seitz | |
| 7,194,867 B2 | 3/2007 | Bartlett et al. | |
| 7,278,444 B2 | 10/2007 | Lucas et al. | |
| 7,387,135 B2 | 6/2008 | Anastas | |
| 7,413,162 B2 | 8/2008 | Geiser | |
| 7,428,913 B2 | 9/2008 | Benson | |
| 7,481,417 B2 | 1/2009 | Mayer et al. | |
| 7,500,649 B2 | 3/2009 | Litscher et al. | |
| 7,643,909 B2 | 1/2010 | Goldman et al. | |
| 7,654,505 B2 | 2/2010 | Schoen | |
| 7,731,156 B2 | 6/2010 | Duelli | |
| 7,762,527 B2 | 7/2010 | Schoen | |
| 7,950,294 B2 | 5/2011 | Davidkovich et al. | |
| 7,959,130 B2 | 6/2011 | Duelli | |
| 7,980,529 B2 | 7/2011 | Seitz | |
| 2004/0246649 A1 | 12/2004 | Besen | |
| 2005/0062007 A1 | 3/2005 | Fischer | |
| 2005/0199848 A1 | 9/2005 | Seitz | |
| 2006/0169940 A1 | 8/2006 | Mayer et al. | |
| 2006/0192345 A1 * | 8/2006 | Li | 277/410 |
| 2007/0039549 A1 | 2/2007 | Shajii et al. | |
| 2007/0039550 A1 | 2/2007 | Shajii et al. | |
| 2007/0042508 A1 | 2/2007 | Shajii et al. | |
| 2007/0138426 A1 | 6/2007 | Geiser | |
| 2007/0235668 A1 | 10/2007 | Goldman et al. | |
| 2009/0016855 A1 | 1/2009 | Hofmeister et al. | |
| 2009/0084997 A1 * | 4/2009 | Lee | 251/129.01 |
| 2009/0133436 A1 | 5/2009 | Boiarski et al. | |
| 2009/0314074 A1 | 12/2009 | Davidkovich et al. | |
| 2010/0036534 A1 | 2/2010 | Ding | |
| 2010/0108151 A1 | 5/2010 | Duelli et al. | |
| 2010/0116349 A1 | 5/2010 | Fischer | |
| 2010/0219362 A1 | 9/2010 | Duelli | |
| 2010/0313583 A1 | 12/2010 | Dresens et al. | |
| 2011/0095218 A1 | 4/2011 | Schoch et al. | |
| 2011/0140023 A1 | 6/2011 | Sauer et al. | |

FOREIGN PATENT DOCUMENTS

| | | |
|---|---|---|
| CH | 700247 B1 | 7/2010 |
| CH | 700327 B1 | 8/2010 |
| CN | 1892080 A | 1/2007 |
| CN | 1987171 A | 6/2007 |
| CN | 101046258 A | 10/2007 |
| CN | 101067463 A | 11/2007 |
| CN | 101109450 A | 1/2008 |
| CN | 101109452 A | 1/2008 |
| CN | 101319737 A | 12/2008 |
| DE | 4401215 C1 | 5/1992 |
| DE | 4446947 A1 | 7/1996 |
| DE | 102007048252 A1 | 4/2009 |
| EP | 2224153 A1 | 9/2010 |
| GB | 1468462 A | 3/1977 |
| JP | 2001289333 A | 10/2001 |
| JP | 2002250470 A | 9/2002 |
| JP | 2002295687 A | 10/2002 |
| JP | 2003120857 A | 4/2003 |
| JP | 2003139256 A | 5/2003 |
| JP | 2003269655 A | 9/2003 |
| JP | 2004028335 A | 1/2004 |
| JP | 2005127511 A | 5/2005 |
| JP | 2005291221 A | 10/2005 |
| JP | 2008025839 A | 2/2008 |
| KR | 20020060568 A | 7/2002 |
| KR | 20020060569 A | 7/2002 |
| KR | 20050001457 A | 1/2005 |
| KR | 20060050459 A | 5/2006 |
| KR | 20060051114 A | 5/2006 |
| KR | 20070065843 A | 6/2007 |
| KR | 20080026492 A | 3/2008 |
| KR | 20100009516 A | 1/2010 |
| KR | 20100042231 A | 4/2010 |
| KR | 20110057198 A | 5/2011 |
| KR | 20110068879 A | 6/2011 |
| KR | 20110073476 A | 6/2011 |
| SG | 158810 A1 | 2/2010 |
| WO | 0201035 A2 | 1/2002 |
| WO | 0201097 A2 | 1/2002 |
| WO | 2010115917 A1 | 10/2010 |
| WO | 2011072315 A1 | 6/2011 |
| WO | 2011088482 A1 | 7/2011 |

OTHER PUBLICATIONS

PCT International Search Report; PCT/US2012/047102; Dec. 10, 2012, 3 pages.

PCT Written Opinion of the International Searching Authority; PCT/US2012/047102; Dec. 10, 2012, 4 pages.

* cited by examiner

Fig. 16A ent text and figures omitted for brevity>

MULTI-VANE THROTTLE VALVE

This application claims the benefit of U.S. Provisional Patent Application No. 61/509,765, filed Jul. 20, 2011.

BACKGROUND OF THE INVENTION

1. Field of the Invention

The present invention relates generally to valves for processing systems. Particularly, the present invention relates to throttle valves for vacuum systems.

2. Description of the Prior Art

Various types of valves have been devised for use in vacuum processing systems. The types of valves include gate valves, butterfly valves, multi-vane valves, and the like. Some gate valves are designed for opened and closed positions to allow for either full flow or no flow of gaseous fluids through the valve. Butterfly valves are relatively simple in design but have limited ability to achieve a linear conductance response. Multi-vane valves provide more precise control than butterfly valves.

One example of a multi-vane valve is described in U.S. Pat. No. 6,293,306 (Brenes, 2001). Brenes discloses a throttle gate valve that includes an upright, generally rectangular valve housing. Within the valve housing is positioned a linearly movable gate valve for closing off a thru-opening formed in the lower part of the valve housing. A pneumatic actuator assembly provides for moving the gate valve between an opened and a closed position. A throttle valve assembly compartment forms the lower side of valve housing and frames the through opening and includes a set of throttle vanes rotatably positioned within the through opening. A drive actuator is provided for rotating the vanes and includes a drive actuator compartment and a motor for controlling the position of the throttle vanes. The drive actuator is sealed by a bellows shield at the point where the drive actuator extends into the interior of the housing.

Another type of multi-vane valve is a throttle valve sold under the trademark "Vari-Q" by MeiVac, Inc. The MeiVac throttle valve includes a circular valve chamber containing a plurality of counter-rotating, triangular (i.e. pie shaped) vanes that are interconnected by a low friction cable-drive system.

Figure 1A:
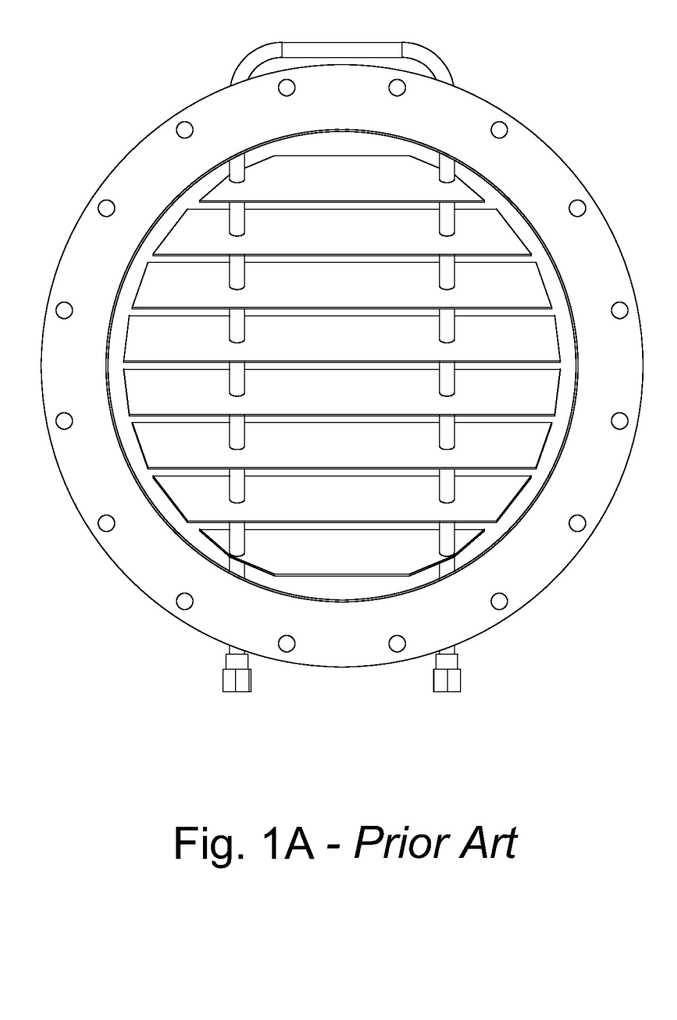
FIG. 1A is a front view of one prior art device of a multi-vane valve.
Figure 1B:
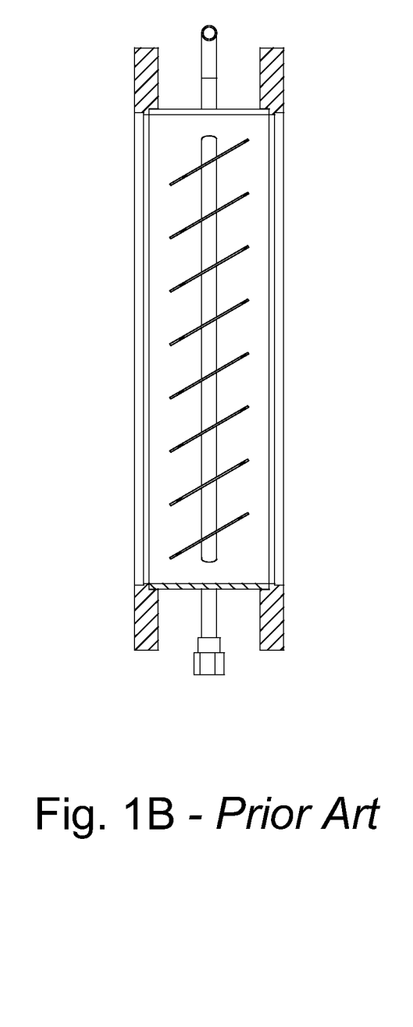
FIG. 1B is a side view of the prior art device shown in FIG. 1A.

Still another type of multi-vane valve is a fixed-positioned vane valve sold under the trademark "Temescal" by Ferrotec (USA) Corporation as part number 0627-0624-0. This multi-vane valve is not truly a valve since all of the vanes are in a fixed position in the range of 30-45 degrees, which are in fluid communication with cryogenic pumps. The vanes are each brazed to a stainless steel tube that is transverse to all of the vanes. The vanes act as a heat shield as well as to transfer heat to the stainless steel tube that contains cooling water flowing through the tube. FIGS. 1A and 1B illustrates an example of such a fixed, multi-vane valve showing a front view and a cross-sectional side view of the structural relationship of the cooling tube and the plurality of fixed vanes.

SUMMARY OF THE INVENTION

Vacuum processing systems generally have a processing chamber of the type typically used for fabrication of computer chips and a vacuum pump, which is used to evacuate the processing chamber. High-vacuum pumps typically operate at pressures below those for plasma processing. All multi-vane valves attempt to provide greater control of the processing environment and to protect the high-vacuum pumps from heat and debris from the processing chamber. Multi-vane valves work by throttling the gas in the process chamber to create a differential pressure across the valve allowing the vacuum pump to operate at high vacuum levels while maintaining correct process pressures in the chamber. Multi-vane throttle valves having rotatable vanes provide greater control of the correct process pressures in the chamber by providing linear control over the full range of operation of the multi-vane valve. The disadvantage of the multi-vane throttle valves of the prior art is their limited capacity to shield the high vacuum pump from heat and/or debris.

It is an object of the present invention to provide a multi-vane throttle valve for use in vacuum processing systems capable of providing a full range of linear conductance control. It is another object of the present invention to provide a multi-vane throttle valve that is capable of performing as a heat shield for the vacuum pump. It is a further object of the present invention to provide a multi-vane throttle valve that is a heat shield with vane cooling capacity. It is a further object of the present invention to provide a multi-vane throttle valve with a simplified construction for maintaining the vacuum seal integrity between the vane chamber and the atmospheric side of the valve.

The present invention achieves these and other objectives by providing a multi-vane throttle valve for controlling the conductance of a vacuum pumping port and to protect the vacuum pump from debris and heat exposure.

In one embodiment, a multi-vane throttle valve for a vacuum process chamber includes a throttle chamber body having an inside exposed to the vacuum process chamber and an outside exposed to atmospheric pressure, the chamber body defining a through-opening for controlling vacuum within the vacuum process chamber, a plurality of rotatable vanes mounted within the through-opening for controlling a flow of gases through the through-opening where each rotatable vane includes a cooling fluid pathway in fluid communication with and disposed longitudinally along each rotatable vane, and a drive mechanism disposed on and connected to an outside of the throttle chamber body for rotating the plurality of rotatable vanes to vary the flow of process gases.

In another embodiment of the present invention, the cooling fluid pathway is a cooling conduit disposed longitudinally along the rotatable vane.

In further embodiment of the present invention, the cooling conduit is selected from the group consisting of a straight conduit, a sinusoidal conduit, a square-wave shaped conduit, a pair of longitudinal conduits with a transverse conduit connecting the pair of longitudinal conduits on one end, a pair of concentric conduits defining a flow path between an inner conduit and an outer conduit, and a longitudinal heat pipe.

In yet another embodiment of the present invention, each of the plurality of rotatable vanes are interconnected in series forming a single, continuous flow path.

In still another embodiment of the present invention, the drive mechanism includes an actuator arm, a rotating arm fixedly connected to each rotatable vane, and a linking arm pivotally connecting a rotating arm of one rotatable vane with a rotating arm of an adjacent rotatable vane in series where one linking arm connects to the actuator arm.

In another embodiment of the present invention, the rotating arm is connected on one end to the rotatable vane and on the other end to the linking arm.

In a further embodiment of the present invention, the throttling valve includes a debris shield attached to each of the plurality of rotatable vanes.

In still another embodiment of the present invention, the throttle chamber body includes a first body flange, a second body flange and a vane chamber housing connected between the first body flange and the second body flange where the vane chamber housing contains the plurality of rotatable vanes.

In a further embodiment of the present invention, the vane chamber housing includes a top plate, a bottom plate, a first chamber side wall, a second chamber side wall, and a vane support feedthrough attached to the first chamber side wall that supports the cooling fluid pathway of a rotatable vane and maintains the pressure differential between the vacuum chamber process and the atmospheric pressure.

In yet another embodiment of the present invention, the throttle valve includes a vacuum feedthrough supporting each of the plurality of rotatable vanes between the vacuum chamber process inside and the atmospheric pressure outside of the throttling valve.

In another embodiment, the multi-vane throttle valve includes a magnetic fluid vacuum feedthrough supporting each of the rotating vanes on one end between the inside and the outside of the throttle chamber body.

In a further embodiment, the multi-vane throttle valve includes a rotary adapter connected to one end of each rotating vane for transporting cooling fluid between each rotating vane.

In still another embodiment of the multi-vane throttle valve, when the cooling conduit is a heat pipe, the throttle valve further includes a cooling block for rotatably receiving one end portion of the heat pipe that is outside of the vane chamber housing. The cooling block may optionally be a liquid flow block or a thermoelectric module block or a combination thereof.

In yet another embodiment of the multi-vane throttle valve, the rotating vane includes a cooling conduit extending laterally along the longitudinal center line of the rotating vane and into a rotating joint that transports cooling fluid between each rotating vane.

In another embodiment of the multi-vane throttle valve, the rotating vane includes a cooling conduit having a pair of concentric tubes extending laterally along the longitudinal center line of the rotating vane and into a rotating joint that transports cooling fluid between each rotating vane.

In a further embodiment of the multi-vane throttle valve, the rotating vane includes a first cooling conduit disposed on the vane to one side of the longitudinal center line of the rotating vane and a second cooling conduit disposed on the vane to an opposite side of the longitudinal center line of the rotating vane. The first cooling conduit is in fluid communication with the second cooling conduit and both cooling conduits are in fluid communication with a rotating joint that transports cooling fluid between each rotating vane.

In another embodiment of the multi-vane throttle valve, the rotating vane includes a debris shield disposed onto one side of the rotating vane.

In still another embodiment of the multi-vane throttle valve, the valve includes a coolant selected from water, cryogenic material and the like.

DETAILED DESCRIPTION OF THE PREFERRED EMBODIMENT

Figure 2:
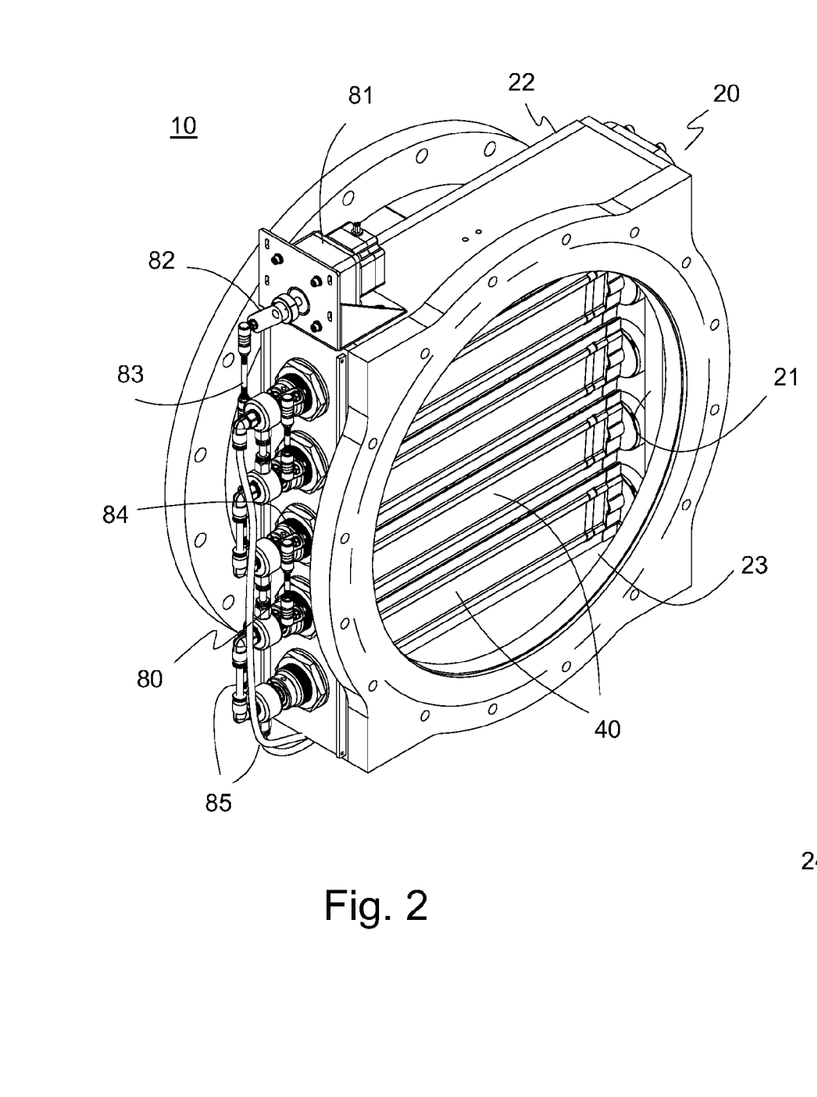
FIG. 2 is a perspective view of one embodiment of the present invention showing a multi-vane throttle valve.

The preferred embodiment of the present invention is illustrated in FIGS. 2-17. FIG. 2 illustrates one embodiment of a multi-vane throttle valve 10 of the present invention. Throttle valve 10 includes a throttle chamber body 20, a plurality of rotatable vanes 40, and a drive mechanism 80. Throttle chamber body 20 has a vane chamber housing 20a, an inside surface 21 and an outside surface 22 that defines a through-opening 23 in which are disposed the plurality of rotatable vanes 40. Drive mechanism 80 is disposed on and connected to an outside 22 of the throttling chamber body 20 for moving the plurality of rotatable vanes 40 to vary the flow of process gases. Drive mechanism 80 has a drive motor 81 with an actuator arm 82 connected to a releasable linking arm 83 that is releasably and rotatably connected to a rotating arm 84. A fluid conduit 85 is interconnected with each of the plurality of rotatable vanes 40.

Figure 3:
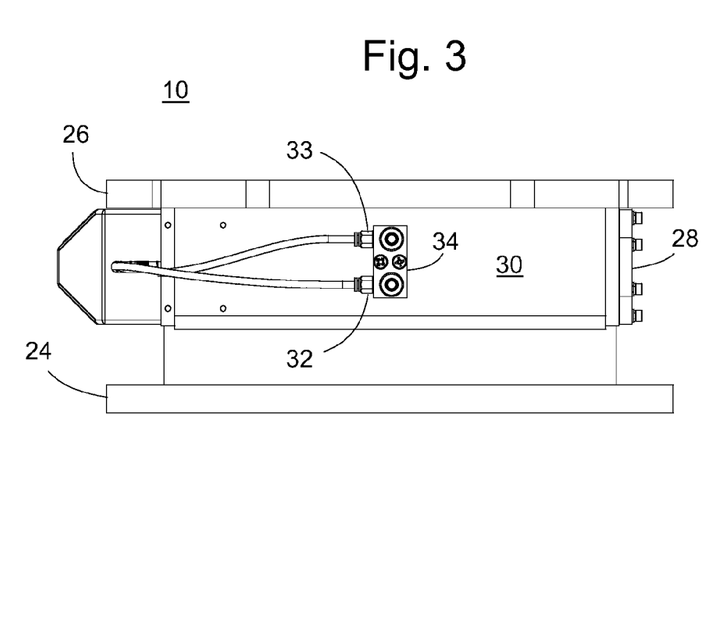
FIG. 3 is a bottom view of the embodiment shown in FIG. 2.

FIG. 3 is a bottom view of multi-vane throttle valve 10. From this view, it can be seen that this embodiment of throttle chamber body 20 includes a first body flange 24 that is the vacuum pump side and a second body flange 26 that is the process chamber side. Between first body flange 24 and second body flange 26 is through-opening 23, which includes a vane chamber 28 in which is mounted the plurality of rotatable vanes 40. Vane chamber 28 has a bottom plate 30 on which is mounted a cooling fluid inlet port 32 and a cooling fluid outlet port 33 mounted to a cooling fluid manifold 34.

Figure 4:
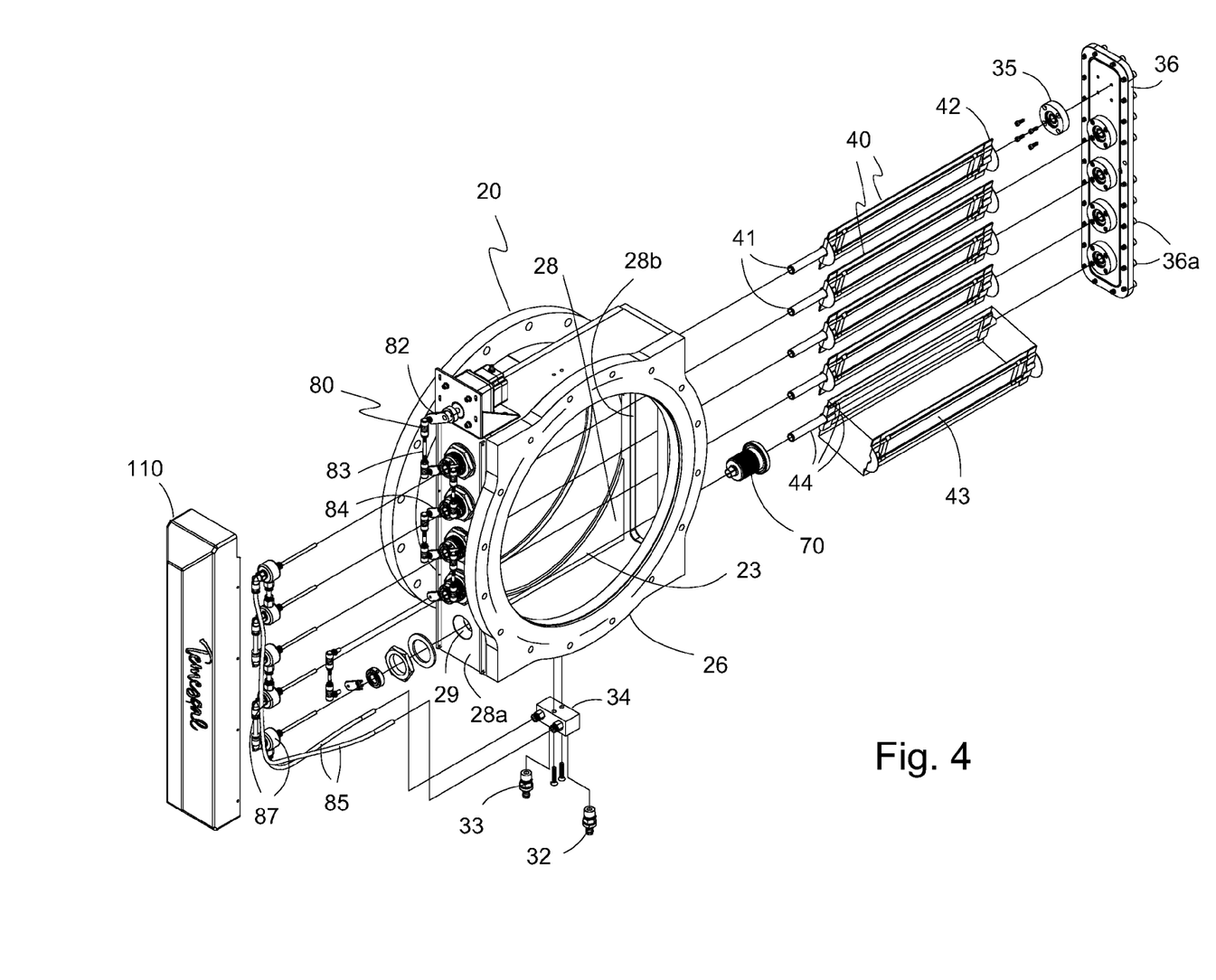
FIG. 4 is an exploded view of the embodiment in FIG. 2 showing the debris shield and the magnetic fluid feedthrough.

Turning now to FIG. 4, there is shown an exploded view of the embodiment of multi-vane throttle valve 10 illustrated in FIG. 1. As can be more clearly seen, throttle chamber body 20 has through-opening 23 showing vane chamber 28 adjacent second body flange 26. Vane chamber 28 has a first chamber side wall 28a with a plurality of equally-spaced openings 29 in which each opening 29 are mounted a vacuum seal feedthrough 70. Each vacuum seal feedthrough 70 receives therethrough one end 41 of one of the plurality of rotatable vanes 40. Vacuum seal feedthroughs 70 rotatably support vanes 40.

Each of the plurality of rotatable vanes 40 are rotatably supported on an opposite end 42 by a bearing 35 mounted on second side wall plate 36. Second side wall plate 36 is sealingly but removably attached to second side wall 28b with a plurality of bolts 36a to facility access to vane chamber 28 for maintenance and repair when required. In this embodiment, each vane 40 has an optional debris shield 43 attached to one side of vane 40 that is facing the process chamber. Debris shields 43 are preferably used when vane 40 is fabricated from copper. When vane 40 is fabricated from stainless steel, no debris shields are necessary.

Where the process chamber is typically used for chemical vapor deposition, debris which includes the various chemicals that are used for coating targets within the process chamber is more easily removed from stainless steel than from copper. Further, the rotatable vanes 40 also prevent the debris from reaching the vacuum pump, which is more costly to repair so preventing debris from entering the vacuum pump is one important aspect of the present invention.

Another important aspect is the heat involved during the process being undertaken in the process chamber. Because the vacuum pump is typically continuously operating during a process, heated gases involved in the process within the process chamber are evacuated through the vacuum pump. The heat from the gases also causes damage to the vacuum pump. Even though the plurality of vanes 40 when in a completely closed position helps reduce this effect, it is not a practical solution since the purpose of the throttling vanes 40 is to better control the vacuum process, closing them completely is counter-productive.

Another important aspect of the present invention is the incorporation of a cooling system for cooling each of the rotatable vanes 40. The plurality of vanes 40 in the present invention include a cooling conduit 44 that is disposed in and longitudinally extends along the length of each of the plurality of vanes 40. An external cooling liquid flows through cooling conduit 44 in order to remove the heat absorbed from the gas that is being evacuated by the vacuum pump through-opening 23 of multi-vane throttle valve 10. Cooling conduit 44 is in fluid communication with fluid conduit 85 which includes a plurality of rotary joints 87. An optional drive mechanism cover 110 may be mounted over drive mechanism 80 and rotary joints 87 to enclose and protect actuator arm 82, linking arms 83 and rotary arms 84.

Figures 5, 5A, 6:
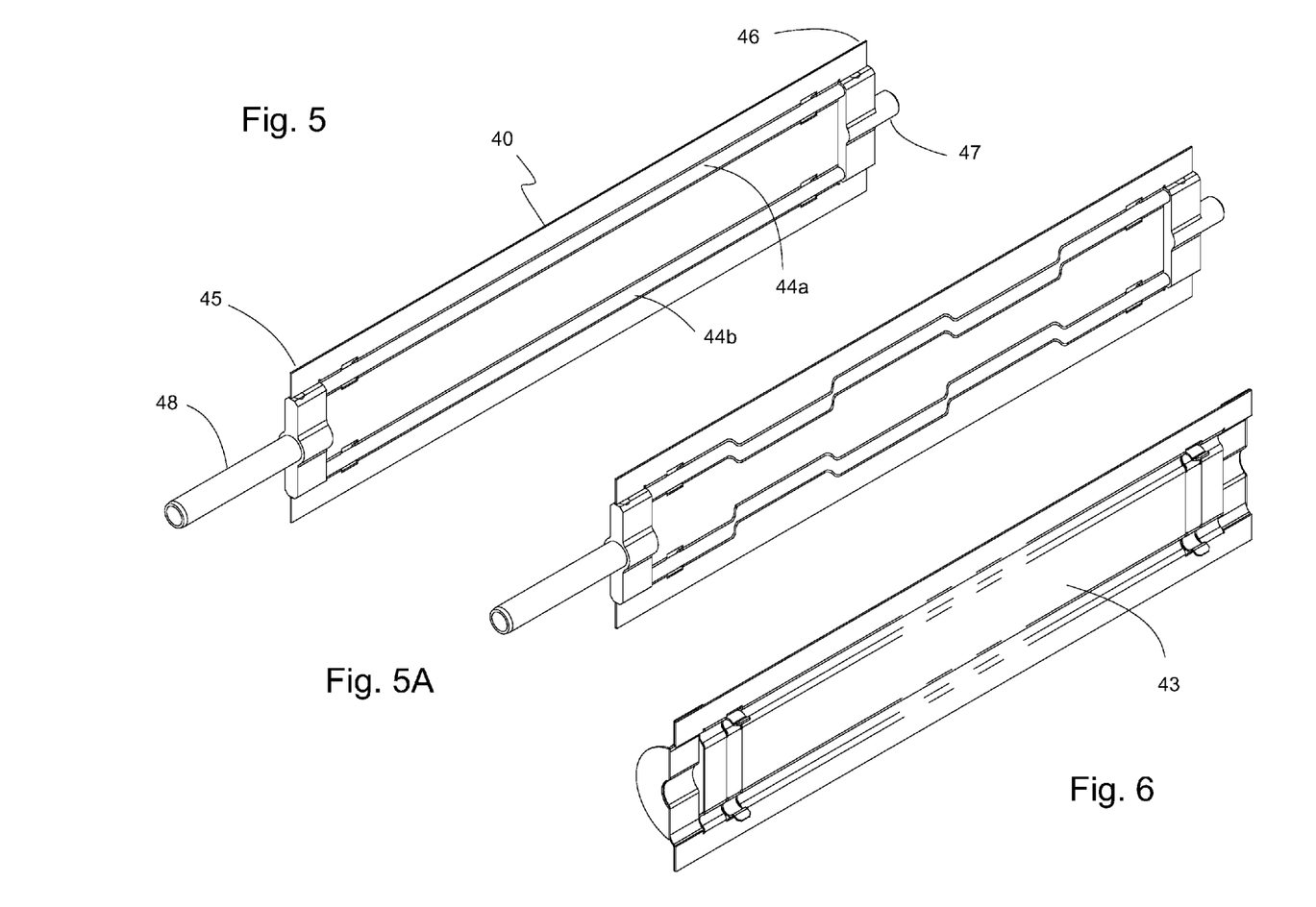
FIG. 5 is a perspective view of one embodiment of a rotatable vane of the present invention showing a pair of parallel, straight cooling conduits.
FIG. 5A is a perspective view of another embodiment of a rotatable vane showing a pair of mirror-image, square-wave cooling conduits.
FIG. 6 is a perspective view of one embodiment of a debris shield of the present invention.

Turning now to FIG. 5, there is shown a perspective view of one embodiment of a vane 40 of the present invention. In this embodiment, vane 40 has a proximal vane end 45 and a distal vane end 46. Distal vane end 46 has a distal support 47 configured to connect distal vane end 46 to a mating support component in second side wall plate 36 of throttle chamber body 20 in a rotatable relationship. Proximal vane end 45 has a proximal support 48 configured to connect proximal vane end 45 to a matting support component in first chamber side wall 28a of throttle chamber body 20 in a rotatable relationship. Vane 40 has a first cooling conduit 44a that extends longitudinally through one half of vane 40 and a second cooling conduit 44b that extends longitudinally though the other half of vane 40. A connecting cooling conduit 44c (shown in FIG. 7) communicates transversely with first cooling conduit 44a and second cooling conduit 44b adjacent distal vane end 46 to create a continuous cooling conduit 44. Although a linear cooling fluid pathway or conduit is illustrated, it is noted that the cooling conduit may have other configurations such as straight conduit, a sinusoidal conduit, a square-wave shaped conduit, a pair of longitudinal conduits with a transverse conduit connecting the pair of longitudinal conduits on one end, a pair of concentric conduits defining a flow path between an inner conduit and an outer conduit, and a longitudinal heat pipe. FIG. 5A illustrates a vane with a pair of square-wave, cooling conduits.

FIG. 6 illustrates a perspective view of optional debris shield 43. Debris shield 43 attaches to one side of vane 40, preferably the side that is exposed to the process chamber in order to prevent damaging material from the process chamber from entering into the vacuum pump. Debris shield 43 may be attached to vane 40 using any known methods including, but not limited to, brazing, using mechanical fasteners, attaching components to allow the shield to snap fit onto vane 40, and the like. Debris shield 43 is preferably made of stainless steel but may be made of any metal and/or non-metal material capable of protecting vanes 40 and maintaining the shields integrity during one or more vacuum chamber processes.

Figure 7:
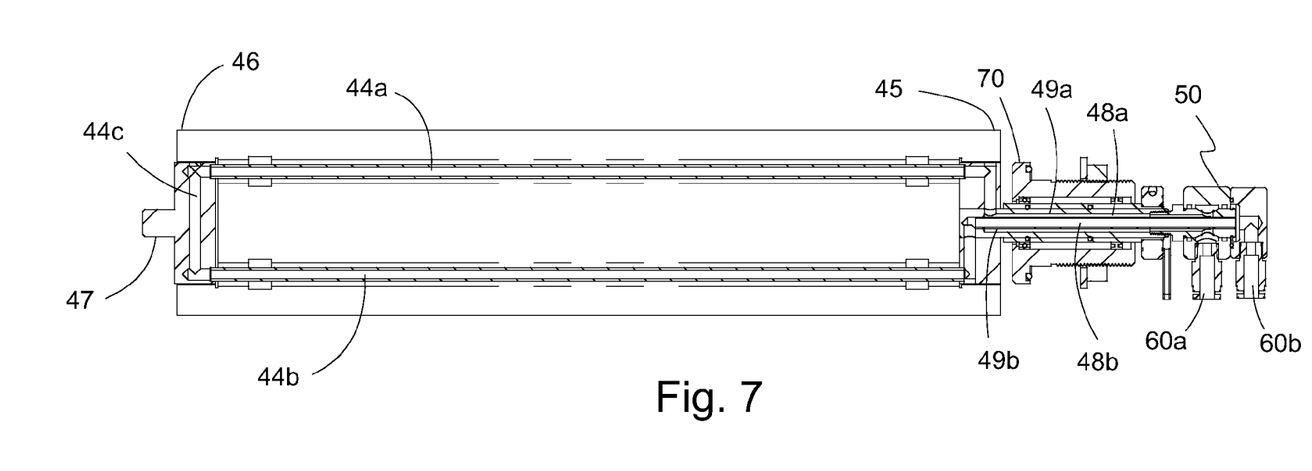
FIG. 7 is a side view of one embodiment of a rotatable vane showing a cross-sectional view of a magnetic fluid support and a rotary joint.

FIG. 7 is a side, partial cross-sectional view of the embodiment of vane 40 shown in FIG. 5 with a coolant supply and coolant return member. As previously discussed, this embodiment of vane 40 includes a proximal vane end 45 and a distal vane end 46. Distal vane end 46 has a distal support 47 while proximal vane end 45 has proximal support 48. Vane 40 has a first cooling conduit 44a that extends longitudinally along or through one half of vane 40 and a second cooling conduit 44b that extends longitudinally along or though the other half of vane 40. A connecting cooling conduit 44c communicates transversely with first cooling conduit 44a and second cooling conduit 44b adjacent distal vane end 46 to create a continuous cooling conduit 44. At proximal vane end 45, proximal support 48 is configured as a pair of concentric tubes 49a (outer tube), 49b (inner tube) forming an outer conduit chamber 48a and an inner conduit chamber 48b where the outer conduit chamber 48a fluidly communicates with first cooling conduit 44a and inner conduit chamber 48b fluidly communicates with second cooling conduit 44b. Inner and outer conduit chambers 48a, 48b extend into a rotary adapter 50 that where each of the inner and outer conduit chambers 48a, 48b communicates with a coolant supply port 60a and a return port 60b, respectively.

Figure 8:
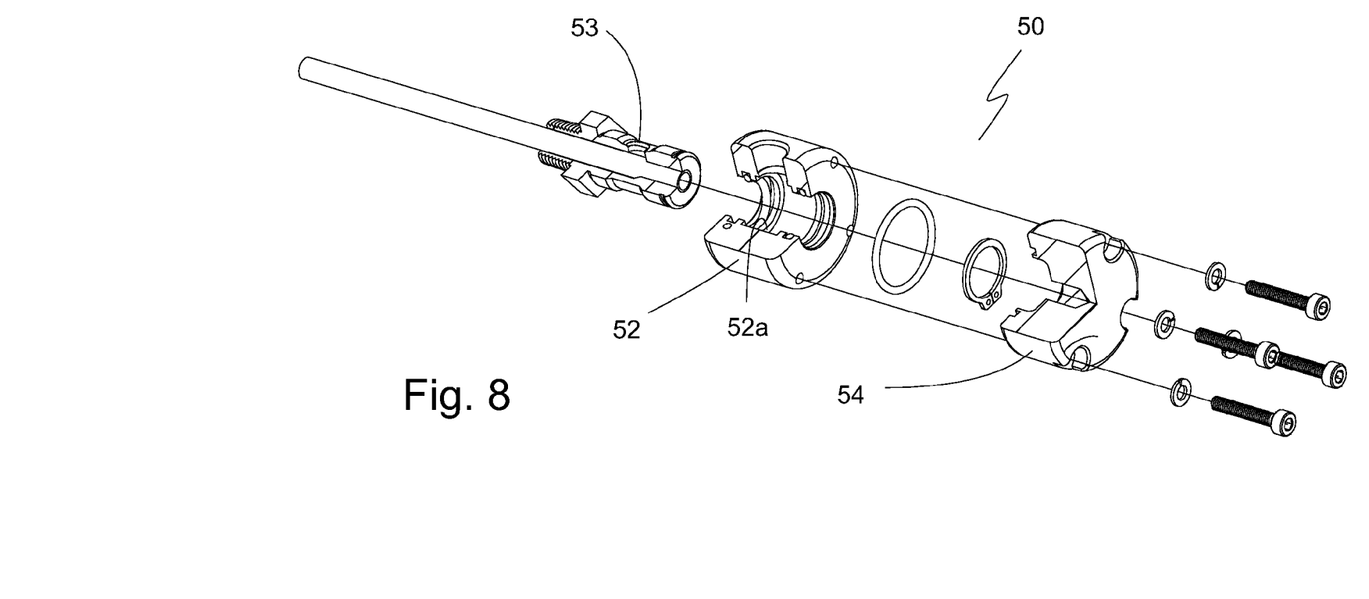
FIG. 8 is a perspective, exploded view of a rotary joint of the present invention.

FIG. 8 shows an exploded, perspective view of rotary adapter 50 illustrated in FIG. 7. In this embodiment of rotary adapter 50, adapter 50 includes a first rotary housing 52 and a second rotary housing 54 axially aligned with and secured to first rotary housing 52. Adapter 50 also includes a hollow shaft 53 that is axially disposed within first rotary housing 52 and is configured to receive inner tube 49b through hollow shaft 53 and into second rotary housing 54. A space 52a is formed between a portion of the outside surface of hollow rotary shaft 53 and the inside wall of first rotary housing 52, which space 52a fluidly communicates with outer conduit chamber 48a of proximal support 48. As shown in FIG. 7, coolant supply port 60a is physically connected to first rotary housing 52 and coolant return supply port 60b is physically connected to second rotary housing 54. This embodiment provides coolant into and out of vane 40 through proximal vane end 45.

Figure 9:
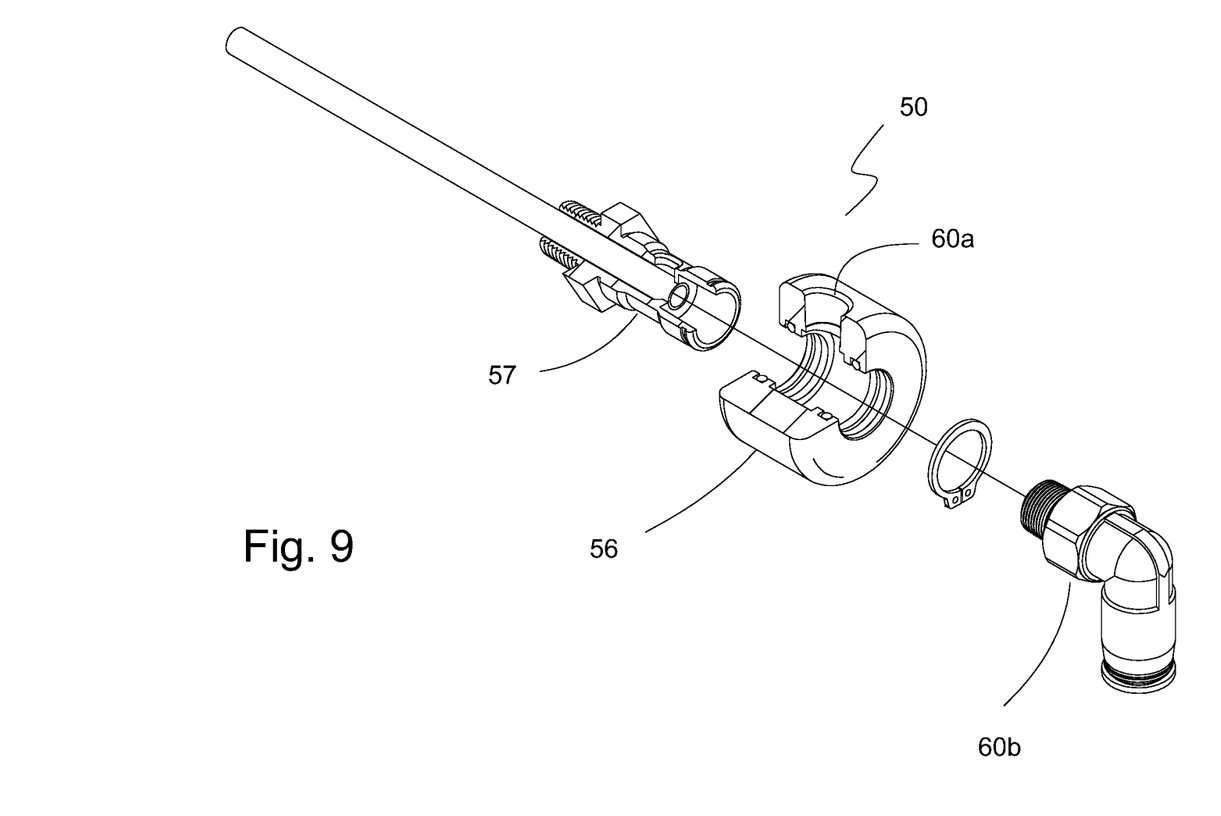
FIG. 9 is a perspective view of another embodiment of a rotary joint of the present invention.

FIG. 9 is a perspective, partial cross-sectional view of another embodiment of rotary adapter 50. In the embodiment, rotary adapter 50 includes only a single rotary housing 56 and a modified rotary shaft 57. Rotary housing 56 provides the same function as first rotary housing 52 with coolant supply port 60a. Rotary shaft 57 is extended through rotary housing 56 and terminated with coolant return port 60b. This embodiment reduces the number of parts required for rotary adapter 50 making assembly and maintenance easier as well as reducing the cost of rotary adapter 50 while providing the same function.

Figure 10:
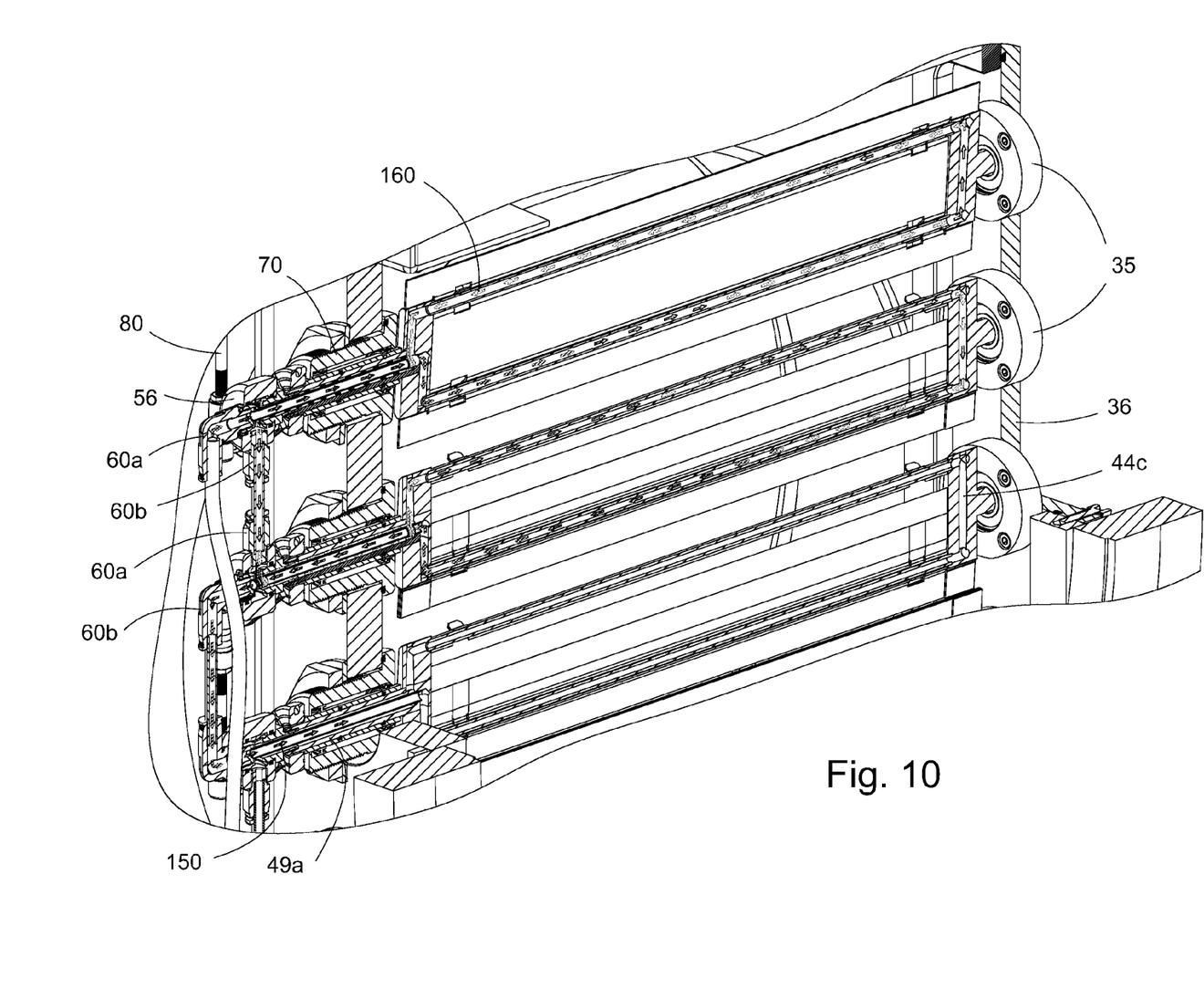
FIG. 10 is an enlarged, partial cross-sectional view of the fluid conduit showing the connections between at least two rotatable vanes and the fluid flow directions through the fluid conduit.

FIG. 10 is an enlarged, cross-sectional view of rotary valve 50 and proximal support 48 showing the fluid flow for cooling vanes 40. In this embodiment, it is illustrated that outer tube 49a of proximal support 48 is rotatably supported by a feedthrough support 70, which is secured to first chamber side wall 28a and inner tube 49b extends beyond feedthrough support 70 and into rotary valve 50. Arrows 150 indicate the flow of coolant into a vane 40 and arrows 160 indicate the flow of coolant out of vane 40. Notwithstanding the description provided above about rotary valve 50 illustrated in FIG. 8, it is understood that when coupling two or more vanes 40 to the coolant supply, one rotary valve 50 will have rotary housing 56 connected to the coolant supply port 60a axially on an end and to the coolant return port 60b transversely but that the next, adjacent vane 40 that is fluidly connected in series to the earlier vane 40, rotary valve 50 will have rotary housing 56 connected to the coolant return port 60b axially on the end and to the coolant supply port 60a transversely. For each additional vane 40, the assignment of coolant supply port 60a and coolant return port 60b to the axial or transverse connection to rotary housing 56 will alternate accordingly in order to form a continuous coolant circuit through vanes 40.

Figure 11:
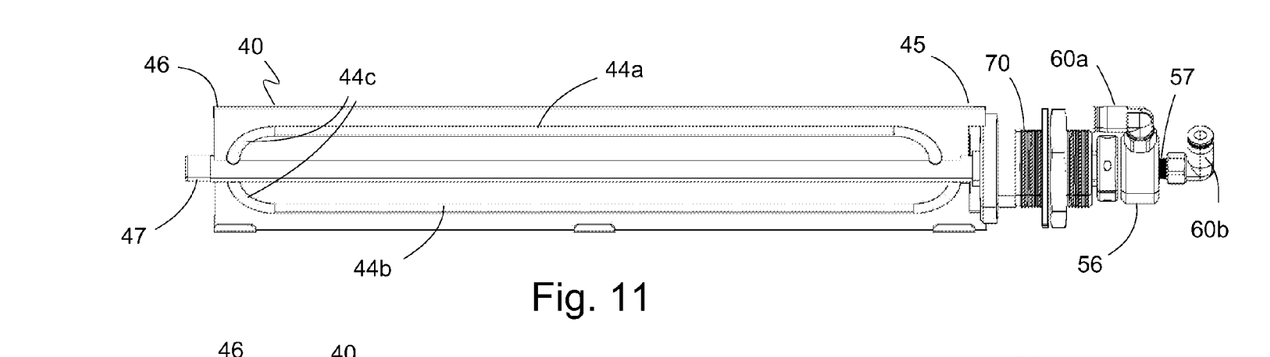
FIG. 11 is a side view of one embodiment of a vane in the present invention showing a rotary valve with a single rotary valve housing.

Turning now to FIG. 11, there is illustrated a side view of a vane 40 with rotary valve 50 illustrated and described in FIG. 9. Like the embodiment of vane 40 illustrated in FIG. 5, this embodiment of vane 40 includes proximal vane end 45 with proximal support 48 and distal vane end 46 with distal support 47. Vane 40 has first cooling conduit 44a that extends longitudinally through one half of vane 40 and second cooling conduit 44b that extends longitudinally though the other half of vane 40. Connecting cooling conduit 44c communicates transversely with first cooling conduit 44a and second cooling conduit 44b adjacent distal vane end 46 to create continuous cooling conduit 44. At proximal support 48 of proximal vane end 45, rotary adapter 50 includes only single rotary housing 56 and modified rotary shaft 57. Rotary housing 56 provides the same function as first rotary housing 52 with coolant supply port 60a. Rotary shaft 57 fluidly communicates through rotary housing 56 and with coolant return port 60b.

Figures 12, 13, 13A:
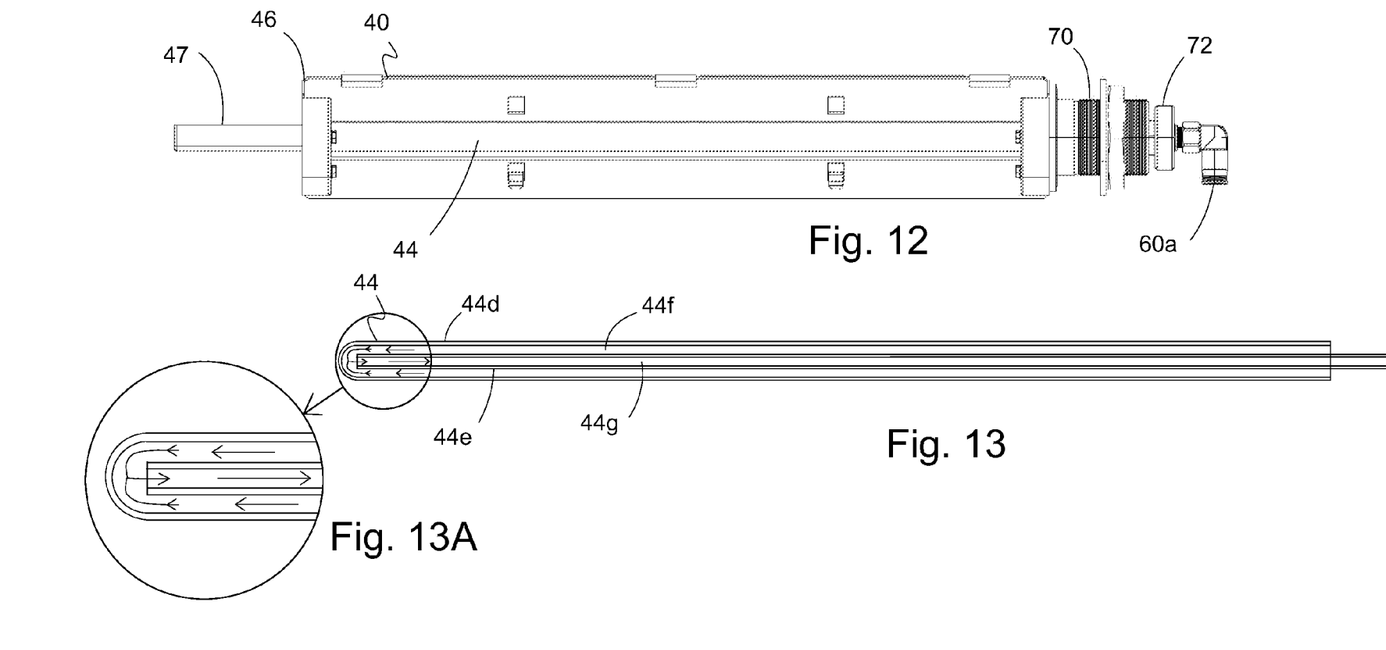
FIG. 12 is a side view of another embodiment of a vane of the present invention showing a coolant conduit that is a single tube positioned along the longitudinal central axis of the vane.
FIG. 13 is a cross-sectional view of another embodiment of a vane of the present invention showing a pair of concentric tubes positioned along the longitudinal central axis of the vane.
FIG. 13A is an enlarged, cross-sectional view of the sealed end of the pair of concentric tubes showing one of two possible flow paths of the cooling fluid.

FIG. 12 illustrates another embodiment of vane 40. In this embodiment, vane 40 has a single, coolant conduit 44 that is extends longitudinally along the longitudinal central axis of vane 40 from proximal support 48 to distal support 47. Proximal support 48 is rotatably supported by feedthrough 70 and includes a single feedthrough collar 72. Because feedthrough 70 rotatably supports proximal vane support 48, coolant supply port 60a may be fixedly attached to feedthrough collar 72 where proximal support 48 is a single tube and not a pair of concentric tubes. Furthermore, it should be noted that since coolant conduit 44 is a single tube that extends along the longitudinal central axis of vane 40, then the fluid coolant must enter one end of vane 40 (i.e. proximal vane end 45 or distal vane end 46) and exit the other end. Accordingly, distal support 47 must also include similar feedthrough 70 and feedthrough collar 72 to which coolant return port 60b is attached. As explained above, where two or more vanes 40 are incorporated within throttle valve 10, the assignment of coolant supply port 60a and coolant return port 60b to the feedthrough collars 72 at proximal vane end 45 and distal vane end 46 will alternate accordingly in order to form a continuous coolant circuit through vanes 40.

FIG. 13 illustrates another embodiment of coolant conduit 44 of vane 40 (not shown) where cooling fluid, i.e. coolant, enters and exits from the same end (i.e. proximal vane end 45) of vane 40. In this embodiment, coolant conduit 44 is a pair of concentric tubes 44d (outer tube) and 44e (inner tube) that extends along the longitudinal central axis of vane 40 creating an outer conduit chamber 44f and an inner conduit chamber 44g. Coolant fluid enters one of the conduit chambers and exits through the other of the conduit chambers. FIG. 13A illustrates an enlarged view of coolant conduit 44 at distal vane end 46. Arrows 200 indicate the flow of coolant along the inside of coolant conduit 44. In this configuration, a rotary valve 50 along with feedthrough 70 supports proximal support 48 formed by coolant conduit 40 at proximal vane end 45. As previously described, the direction of coolant fluid flow relative to outer and inner conduit chambers 44f, 44g will alternate for assemblies having two or more vanes 40.

Figure 14:
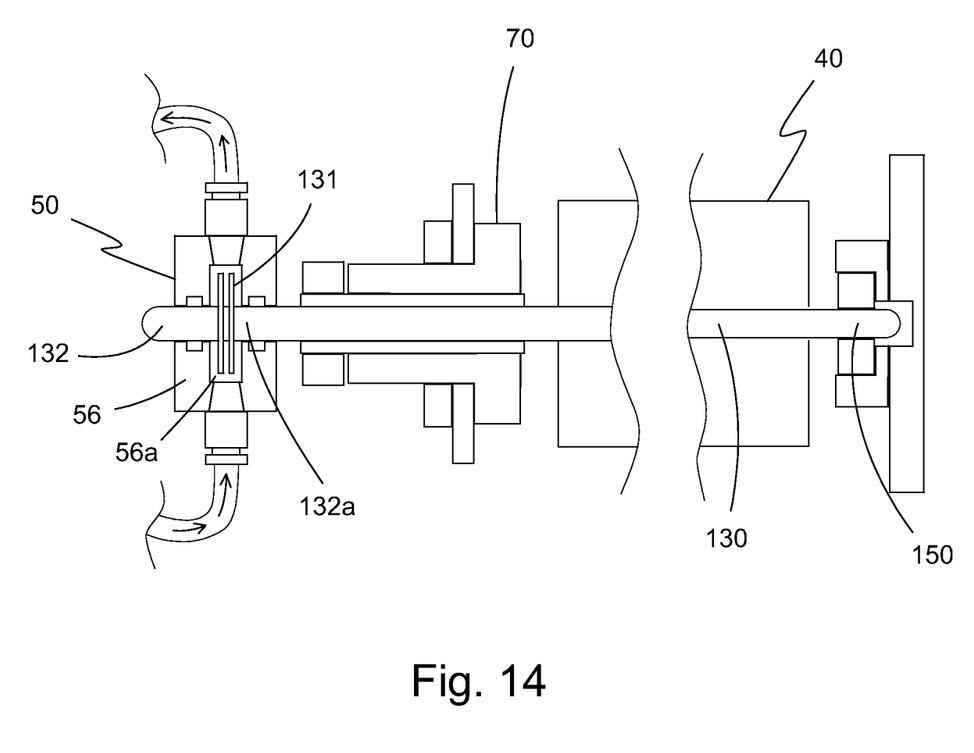
FIG. 14 is a cross-sectional view of another embodiment of a vane of the present invention showing a heat pipe positioned along the longitudinal central axis of the vane.

FIG. 14 illustrates another embodiment of vane 40 with a cooling conduit. In this embodiment, the cooling system of vane 40 includes a heat pipe 130 disposed along the longitudinal central axis of vane 40 that has a heat pipe proximal end 132 and a heat pipe distal end 150. Heat pipe distal end 150 is rotatably supported by a bearing 152 disposed in a bearing housing 154 attached to second side wall 36 of throttle housing body 22. Heat pipe proximal end 132 is rotatably supported by feedthrough 70 and extends outside of throttle housing body 22 into a rotary adapter 50. An end portion 132a of heat pipe proximal end 132 is rotatably held within rotary adapter 50. Rotary adapter 50 may be a coolant block having a rotary housing 56 forming an adapter chamber 56a, coolant supply port 60a and a coolant return port 60b in fluid communication with adapter chamber 56a. Around heat pipe proximal end 132 that is disposed within adapter chamber 56a are connected a plurality of heat pipe cooling fins 131 that are thermally connected to heat pipe 130. Instead of a coolant block, one or more thermoelectric modules may be incorporated as part of rotary adapter 50, which would provide the cooling mechanism for cooling heat pipe proximal end 132. Heat pipe 130 and the thermoelectric module have the typical operating and structural characteristics of those components and are well known to those of ordinary skill in the respective arts so no explanation or discussion of their operation is required.

Figure 15:
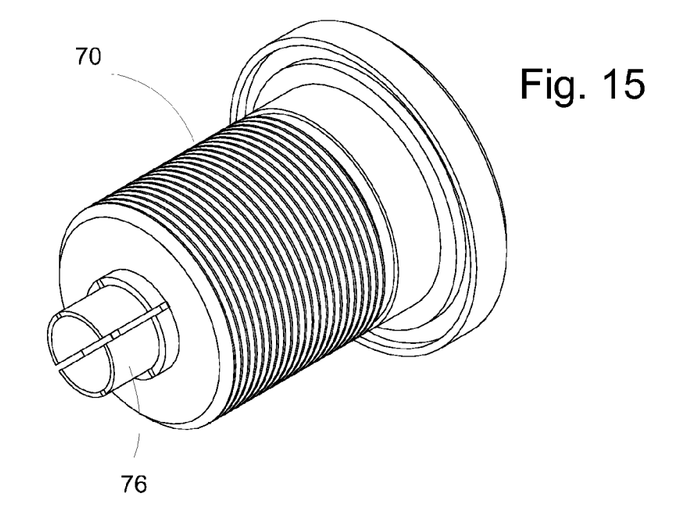
FIG. 15 is a perspective view of one embodiment of a feedthrough of the present invention.

FIG. 15 illustrates a perspective view of one embodiment of feedthrough 70. Feedthrough 70 has a feedthrough flange 74 and securing nut 75 for attaching feedthrough 70 to a side wall of vane chamber 28. Feedthrough 70 also includes a hollow shaft 76 for receiving and supporting the end of vane 40. Hollow shaft 76 rotated within feedthrough 70 and maintains a seal between the inside of throttle vane valve, which is at a reduced pressure, and the outside of throttle vane valve, which is at atmospheric pressure.

Figure 16A:
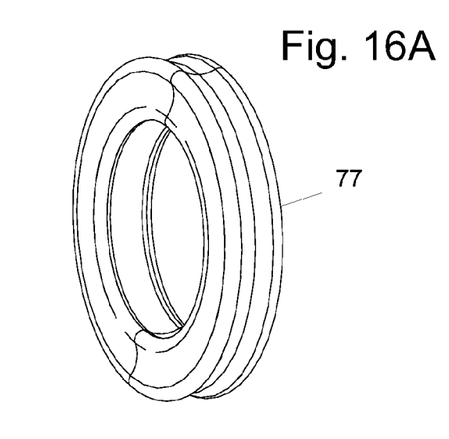
FIG. 16A is a perspective view of a quad O-ring incorporated in one embodiment of a feedthrough of the present invention.
Figure 16B:
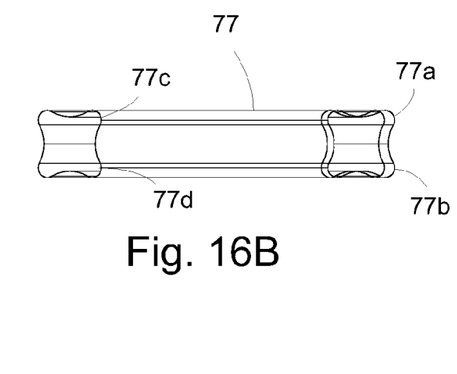
FIG. 16B is a cross-sectional view of the quad O-ring shown in FIG. 16A.

FIGS. 16A and 16B illustrate one embodiment of a sealing structure of feedthrough 70 used to rotatably support proximal support 48 and, in the case where a single coolant conduit is disposed along the longitudinal central axis of vane 40, and distal support 47. In one embodiment shown in FIGS. 16A and 16B, feedthrough 70 incorporates a quad O-ring 77 seal to isolate the vacuum inside the throttle valve body 22 and the atmosphere outside of throttle valve body 22. Quad O-ring 77 incorporates two sealing surfaces 77a, 77b on the outer periphery of the O-ring and two sealing surfaces 77c, 77d on the inner periphery of the O-ring. The quad O-ring 77 provides increased reliability over standard O-rings.

Figure 17:
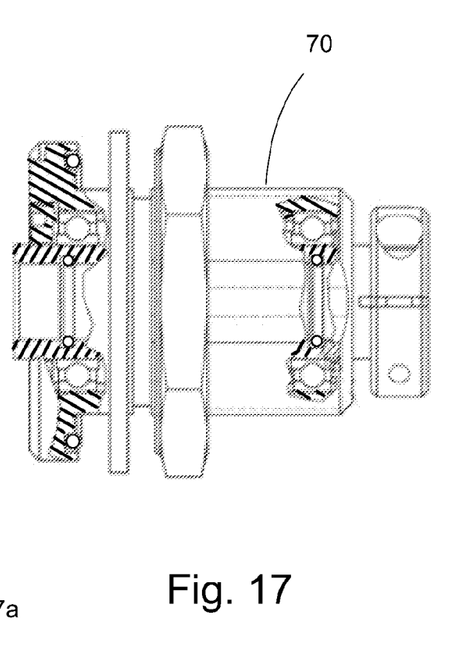
FIG. 17 is a side view of a feedthrough of the present invention that is a magnetic fluid feedthrough.

FIG. 17 illustrates a side view of a preferred embodiment of feedthrough 70. In this embodiment, feedthrough 70 incorporates a magnetic fluid seal and associated components for forming such a seal. The preferred magnetic fluid feedthrough 70 is available from Ferrotec (USA) Corporation, Bedford, N.H. under custom product no. HS-500-SFBSC.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A multi-vane throttling valve for a vacuum process chamber, the valve comprising:
    a throttle chamber body having an inside exposed to the vacuum process chamber and an outside exposed to atmospheric pressure, the chamber body defining a through-opening for controlling vacuum within the vacuum process chamber;
    a plurality of rotatable vanes mounted within the through-opening for controlling a flow of gases through the through-opening wherein each rotatable vane includes a proximal support, a distal support and a cooling fluid pathway that extends through at least one of the proximal support or the distal support, the cooling fluid pathway being in fluid communication with and disposed longitudinally along each rotatable vane wherein the cooling fluid pathway of each rotatable vane extends outside of the throttle chamber body and into a rotary adapter having a coolant supply port and a coolant return port and wherein the at least one of the proximal support or the distal support is rotatably coupled to the rotary adapter, each rotary adapter being exposed to atmospheric pressure and the cooling fluid pathway of each rotatable vane being in fluid communication with an adjacent rotatable vane through the coolant supply port and the coolant return port of the rotary adapter; and
    a drive mechanism disposed on and connected to an outside of the throttle chamber body for rotating the plurality of rotatable vanes to vary the flow of process gases, the drive mechanism capable of simultaneously rotating a rotating arm fixedly connected to each proximal support of the plurality of rotatable vanes.

2. The multi-vane throttling valve of claim 1 wherein the cooling fluid pathway is a cooling conduit disposed longitudinally along the rotatable vane.

3. The multi-vane throttling valve of claim 2 wherein the cooling conduit is selected from the group consisting of a straight conduit, a sinusoidal conduit, a square-wave shaped conduit, a pair of longitudinal conduits with a transverse conduit connecting the pair of longitudinal conduits on one end, a pair of concentric conduits defining a flow path between an inner conduit and an outer conduit, and a longitudinal heat pipe.

4. The multi-vane throttling valve of claim 3 wherein, the cooling conduit is a heat pipe and the throttling valve further includes a cooling block for rotatably receiving one end portion of the heat pipe that is outside of the vane chamber housing.

5. The multi-vane throttling valve of claim 4 wherein the cooling block is a thermoelectric module block.

6. The multi-vane throttling valve of claim 1 wherein each of the plurality of rotatable vanes includes a cooling conduit disposed longitudinally along the rotatable vane, wherein the cooling conduits of each of the plurality of rotatable vanes are connected in series, thereby forming a single, continuous flow path.

7. The multi-vane throttling valve of claim 1 wherein the drive mechanism includes an actuator arm, the rotating arm fixedly connected to each of the plurality of rotatable vanes, and at least one linking arm pivotally connecting the rotating arm of one of the plurality of rotatable vanes with the rotating arm of an adjacent one of the plurality of rotatable vanes in series wherein one of the at least one linking arm connects to the actuator arm.

8. The multi-vane throttling valve of claim 7 wherein the rotating arm of each of the plurality of rotatable vanes is connected on one end to the rotatable vane and on the other end to the linking arm.

9. The multi-vane throttling valve of claim 1 further comprising a debris shield directly attached to each of the plurality of rotatable vanes.

10. The multi-vane throttling valve of claim 1 wherein the throttle chamber body includes a first body flange, a second body flange and a vane chamber housing connected between the first body flange and the second body flange, the vane chamber housing containing the plurality of rotatable vanes.

11. The multi-vane throttling valve of claim 10 wherein the vane chamber housing includes a top plate, a bottom plate, a first chamber side wall, a second chamber side wall, and a vane support feedthrough attached to the first chamber side wall that supports the cooling liquid flow pathway of a rotatable vane and maintains the pressure differential between the vacuum chamber process and the atmospheric pressure.

12. The multi-vane throttling valve of claim 1 further comprising a vacuum feedthrough supporting each of the plurality of rotatable vanes between the vacuum chamber process inside and the atmospheric pressure outside of the throttling valve.

13. The multi-vane throttling valve of claim 12 wherein the vacuum feedthrough is a magnetic fluid vacuum feedthrough.

14. A method of providing a full range of linear conductance control in a vacuum process chamber during a vacuum chamber process using a throttling valve, the method comprising:
    obtaining a multi-vane throttling valve for use with the vacuum process chamber and incorporating a plurality of rotatable vanes disposed in a vane chamber housing of a throttle chamber body, wherein the plurality of rotatable vanes are each mounted within a through-opening for controlling a flow of gases through the throttling valve;
    configuring each of the plurality of rotatable vanes with a proximal support, a distal support and a cooling conduit that extends through at least one of the proximal support or the distal support and defines a cooling fluid pathway, the cooling fluid pathway being in fluid communication with and longitudinally disposed along each rotatable vane wherein the cooling fluid pathway of each rotatable vane extends outside of the throttle chamber body and into a rotary adapter having a coolant supply port and a coolant return port and wherein the at least one of the proximal support or the distal support is rotatably coupled to the rotary adapter, each rotary adapter being exposed to atmospheric pressure and the cooling fluid pathway of each rotatable vane being in fluid communication with an adjacent rotatable vane through the coolant supply port and the coolant return port of the rotary adapter;

flowing cooling liquid through the cooling conduit of each rotatable vane; and rotatably adjusting the orientation of each rotatable vane to thereby provide linear conductance control during vacuum processing in the vacuum process chamber.

15. The method of claim 14 wherein the configuring step includes configuring the cooling conduit as one of a straight conduit, a sinusoidal conduit, a square-wave shaped conduit, a pair of longitudinal conduits with a transverse conduit connecting the pair of longitudinal conduits on one end, a pair of concentric conduits defining a flow path between an inner conduit and an outer conduit, a longitudinal heat pipe, or a combination thereof.

16. The method of claim 15 further comprising, when the cooling fluid pathway is a heat pipe, connecting a cooling block to one end portion of the heat pipe located outside of the vane chamber housing on the atmospheric side of the throttling valve wherein the cooling block rotatably supports the one end portion of the heat pipe.

17. The method of claim 14 wherein the configuring step includes fluidly connecting in series the cooling conduit of each of the plurality of rotatable vanes.

18. The method of claim 14 further comprising attaching a debris shield to each of the plurality of rotatable vanes.

19. The method of claim 14 wherein the obtaining step includes obtaining a throttling valve incorporating a magnetic fluid feedthrough for rotatably supporting the cooling conduit and rotatable vane for each of the plurality of rotatable vanes.

* * * * *